US009993887B2

(12) United States Patent
Zeller

(10) Patent No.: US 9,993,887 B2
(45) Date of Patent: Jun. 12, 2018

(54) METHOD AND APPARATUS FOR CHAMFERING AND DEBURRING GEAR CUT WORKPIECES

(71) Applicant: Liebherr-Verzahntechnik GmbH, Kempten/Allgaeu (DE)

(72) Inventor: Thomas Zeller, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 142 days.

(21) Appl. No.: 14/860,550

(22) Filed: Sep. 21, 2015

(65) Prior Publication Data

US 2016/0089737 A1    Mar. 31, 2016

(30) Foreign Application Priority Data

Sep. 30, 2014  (DE) .................. 10 2014 014 132

(51) Int. Cl.
| B23F 19/10 | (2006.01) |
| B23F 23/12 | (2006.01) |
| B23F 17/00 | (2006.01) |
| B23F 5/22 | (2006.01) |
| B23Q 1/48 | (2006.01) |
| B23Q 1/54 | (2006.01) |

(52) U.S. Cl.
CPC .......... B23F 19/105 (2013.01); B23F 17/006 (2013.01); B23F 19/102 (2013.01); B23F 23/1218 (2013.01); B23F 5/22 (2013.01); B23Q 1/5462 (2013.01); Y10T 29/5176 (2015.01); Y10T 409/10159 (2015.01); Y10T 409/101113 (2015.01); Y10T 409/107632 (2015.01)

(58) Field of Classification Search
CPC ....... Y10T 29/5176; Y10T 409/101113; Y10T 409/101272; Y10T 409/105724; Y10T 409/107632; Y10T 409/107791; B23F 19/10; B23F 19/102; B23F 19/105
USPC ................ 409/8, 9, 37, 49, 50; 29/56.5
See application file for complete search history.

(56) References Cited

U.S. PATENT DOCUMENTS

| 6,577,917 | B1 * | 6/2003 | Ronneberger ...... B23F 23/1218 700/164 |
| 7,103,973 | B2 | 9/2006 | Wolff et al. |
| 7,794,186 | B2 * | 9/2010 | Peiffer ..................... B23F 9/10 409/40 |
| 8,523,499 | B2 | 9/2013 | Senjo et al. |
| 8,769,820 | B2 | 7/2014 | Philippin et al. |
| 2007/0283545 | A1 * | 12/2007 | Langerfeld ............ B23F 5/205 29/56.5 |

(Continued)

FOREIGN PATENT DOCUMENTS

| DE | 1969872 U | 10/1967 |
| DE | 2534574 A1 | 2/1977 |

(Continued)

Primary Examiner — Erica E Cadugan
Assistant Examiner — Michael Vitale
(74) Attorney, Agent, or Firm — McCoy Russell LLP

(57) ABSTRACT

The present disclosure relates to a method and to an apparatus for chamfering and deburring gear cut workpieces, especially of large-volume gear cut workpieces, using a deburring apparatus which is arranged on or at the cutting head of a gear cutting machine and which at least partially utilizes the machine axes of the gear cutting machine to chamfer and to deburr gear teeth along a tooth contour.

6 Claims, 5 Drawing Sheets

(56) References Cited

U.S. PATENT DOCUMENTS

| | | | |
|---|---|---|---|
| 2010/0278605 A1* | 11/2010 | Philippin | B23F 19/102 409/8 |
| 2012/0155980 A1* | 6/2012 | Ronald | B23F 17/006 409/8 |
| 2012/0230791 A1* | 9/2012 | Stadtfeld | B23F 9/10 409/10 |
| 2013/0054172 A1* | 2/2013 | Masuo | G01B 5/202 702/94 |
| 2013/0121779 A1 | 5/2013 | Geiser | |

FOREIGN PATENT DOCUMENTS

| | | |
|---|---|---|
| DE | 4019834 A1 | 1/1992 |
| DE | 10211129 A1 | 10/2003 |
| DE | 202005014619 U1 | 12/2005 |
| DE | 10330474 B4 | 3/2009 |
| DE | 102009019433 A1 | 11/2010 |
| DE | 112008003992 T5 | 7/2011 |
| DE | 202012008601 U1 | 12/2012 |
| DE | 102011118312 A1 | 5/2013 |

* cited by examiner

METHOD AND APPARATUS FOR CHAMFERING AND DEBURRING GEAR CUT WORKPIECES

CROSS REFERENCE TO RELATED APPLICATION

This application claims priority to German Patent Application No. 10 2014 014 132.2, entitled "Method and Apparatus for Chamfering and Deburring Gear Cut Workpieces," filed on Sep. 30, 2014, the entire contents of which is hereby incorporated by reference in its entirety for all purposes.

TECHNICAL FIELD

The present disclosure relates to a method and to an apparatus for chamfering and deburring gear cut workpieces, such as large-volume gear cut workpieces. The chamfering and deburring apparatus is arranged on or at a cutting head of a gear cutting machine and may utilize the machine axes of the gear cutting machine to chamfer and to deburr gear teeth along a tooth contour.

BACKGROUND AND SUMMARY

Burrs form at the tool exit side in the machining of metallic workpieces. These coarse burrs have to be removed prior to the further treatment of the workpieces so that no disturbances can arise in the following processes or so that no injury to the machine operators can occur. Prior to a heat treatment process, the face edges of gear teeth may be provided with a protective chamfer which is intended to protect the tooth edges of the workpiece from damage and bulging and to protect the hard fine machining tool in the following process from highly carburized hard edges and burrs. The term deburring is in this respect frequently used synonymously for deburring and chamfering. Deburring is understood as the removal of the coarse burr which adheres to the workpiece after a metal cutting process, and chamfering is understood as direct application of a protective chamfer. In this way, rough burr is removed in so doing depending on the process.

In the large-scale production of gear cut workpieces with diameters smaller than approx. 500 mm, a chamfering and deburring of gear cut workpieces in a gear cutting machine have become part of the art. One example process for this includes pressure deburring/rotary deburring as shown in DE 25 34 574 A1. Another example process includes cutting a chamfer using special cutters ("Chamfer Cut") as shown in DE 20 2005 014 619 A1. Still another example process includes cutting the chamfers using burrs which are pressed onto the face edges of the gear teeth at a specific angle by means of a defined preload force, so that they "roll off" the chamfer contour ("Gratomat") as shown in DE 1 969 872 U. For smaller gear cut workpieces (<ø −500 mm) such as ones installed in small gearboxes and/or automobile and commercial vehicle gear boxes, the aforementioned chamfering and deburring processes have been used successfully for some time. In mass production, the procurement of especially adapted chamfering and deburring tools is economic since the process carried out therewith takes up little machining time. The chamfer and deburr machining predominantly takes place in such machines in parallel with the primary processing time for gear cutting. However, these tools are especially adapted to specific gear teeth but may still be used with very similar gear teeth (for example other gear widths).

With large gear teeth (workpiece diameter>1000 mm to >16,000 mm), and large modules and workpieces weighing tons, the gear cut workpieces may be machined using manually guided deburring tools, for example, using one-hand grinders. The larger the workpiece diameter and the larger the module, the more probable a manual deburr cutting is used, especially when it is a case of small workpiece batch sizes for which the procurement of a specially adapted deburring tool such as a ChamferCut machine is not economic.

With a more recent process interpretation, the trend is to move away from chamfering using manually guided deburring tools. There are various reasons for this. One reason is that demands on the gear tooth quality are increasing considerably for some gear teeth. With heavy duty gear teeth, for example for wind power gearboxes, attention is paid more and more also to reproducibility for chamfer size and chamfer angle on all teeth and workpieces and to the chamfer quality. Another reason is that the focus in the cutting of these workpieces is no longer only on the pure cutting time, but it is rather more important to obtain a workpiece from the machine which has been fully cut as much as possible. Yet another reason is that for reasons of health and safety, the manual workplaces suffering from high noise and dust emissions are no longer desired in a modern production hall. Still another reason is that blanks and gear cut workpieces are expensive especially in workpieces with large gear teeth. If a gear is strongly damaged on handling, there are in part very long replacement times until a blank is available which can be gear cut. It is therefore also attempted here by the integration of additional processes in the gear cutting machine to produce a workpiece from the machine which is as finished as possible. Further still, there may be workpieces in which end faces of the gear teeth are not planar, but which have slopes, radii or steps. In this case, in particular with helical gear teeth, the application of a uniform chamfer using manually guided deburring tools is very difficult.

Based on the aforementioned reasons, a method for automated generation of the chamfers at the front edges of the gear teeth with large gear teeth is provided. In one example, the method may provide an inexpensive solution and due to the small workpiece batch sizes, gear teeth may be able to be cut which are as different as possible. In addition, the risk that the workpiece is damaged on transport or when being chamfered may be minimized.

Separate deburring machines which are also available for large gear teeth (<3500 mm diameter) currently are not suited. These deburring machines frequently work with a system in which the cutter lies on the tooth edge and thus follows the tooth edge (Gratomat system). The disadvantage of this system is that the chamfer angle and the chamfer size over the tooth height are greatly different.

One example system works with a burr which tracks the tooth contour guided over an auxiliary device. DE 11 2008 003 992 T5 shows an independent deburring machine with two embodiments for both the chamfering and deburring of workpieces with internal teeth and with external teeth. The workpieces are in this respect guided between two workpiece holding rollers and a workpiece drive holding roller in front of the tool. The tool in this respect follows the gear tooth contour over a workpiece probe member. This kind of deburring device, is limited to chamfering of gear teeth having planar end faces of workpieces with straight gear teeth. If slopes or kinks are present in this region, the tool would have to be tracked vertically to the tooth contour in its delivery movement, which has not yet been provided in these units.

Another disadvantage of the above mentioned deburring machines is that they are independent machines having their own control, machine table for the workpiece, safety housing, etc., whereby corresponding costs are incurred. In addition, these machines require a separate installation area, which becomes very noticeable with large gear teeth. The workpiece additionally first has to be transported from the gear cutting machine to the deburring machine and has to be clamped again there, which in turn comprises an increased handling risk.

In yet another example, DE 20 2012 008 601 U1 shows a machine tool having an integrated chamfering and/or deburring device. The deburring device having numerically controlled axes is integrated with vertical adjustability and in a deliverable manner in the base region in a counter-holder stand. The limitation of this unit is it requires an additional back rest and that additionally at least three further numerical control (NC) axes have to be integrated into the machine.

In yet another example, DE 10 2009 019 433 A1 discloses a system having a separate ChamferCut deburring device for a gear cutting machine which is mounted laterally at a stand next to the workpiece table. Ideally, one of the two end faces of the gear teeth should be chamfered during the hobbing by this ChamferCut cutter. The workpiece dependence of the ChamferCut cutter, which is designed directly for specific gear teeth and which can thus be used economically in larger production runs, is disadvantageous in this method.

It is the object of the present disclosure to provide a deburring method and an inexpensive chamfering and deburring apparatus with which a chamfering and deburring, especially of large gear teeth, can take place on one gear cutting machine. The workpiece should subsequently be able to be unclamped from the machine with a completed chamfering and deburring.

This object is achieved in accordance with the present disclosure by a method for chamfering and deburring a gear cut workpiece comprising, arranging a chamfering and deburring apparatus on or at a cutting head of a gear cutting machine; and cutting a chamfer by pivoting a chamfering spindle of the apparatus with a chamfering miller from a rest position outside a disturbing contour of the gear cutting machine into a work position in a working region of a gear cutting tool at the chamfering and deburring apparatus, wherein, the chamfering spindle is positioned with the chamfering miller closer to the workpiece than the gear cutting miller so that the gear cutting tool can remain in a cutting head of a chamfer cutting; wherein movements of the chamfering spindle with a chamfering cutter for a contour tracking along the tooth edge take place by movement of axes of the gear cutting machine.

In a further embodiment the object is achieved by a chamfering and deburring apparatus comprising a chamfering spindle; a chamfering miller; a drive motor; and a control system with computer readable instructions stored on non-transitory memory. After the chamfering and deburring apparatus has been arranged on or at a cutting head of a gear cutting machine; the apparatus is used for cutting a chamfer by pivoting the chamfering spindle with the chamfering miller from a rest position outside a disturbing contour of the gear cutting machine into a work position in a working region of a gear cutting tool, wherein the chamfering spindle is positioned with the chamfering miller closer to a workpiece than a gear cutting miller so that the gear cutting tool can remain in a cutting head of a chamfer cutting; the apparatus moves the chamfering spindle to track a contour of a gear tooth edge via movement of axes of the gear cutting machine.

The apparatus in accordance with the present disclosure is mounted on or at a cutting head of a gear cutting machine. This provides the advantage that the machine axes which are first utilized for generating of gear teeth at a workpiece can also be used at least partly or even completely for the chamfer cutting.

After completing the gear cutting machining, the chamfering and deburring apparatus is moved or pivoted out of its rest position into its work position for carrying out the method in accordance with the present disclosure and the chamfer cutting is subsequently begun. The rest position of the deburring apparatus in this respect may be located on the cutting head above the tool mount for the hob or profile milling cutter for the generation of the gear teeth. Therefore, minimal disturbance is caused to the travel movements of the milling cutter head for the gear machining and the risk of collisions with the workpiece or with the apparatus for the workpiece clamping is low in the gear teeth generation process. On the other hand, the apparatus can be attached very close to the cutting point for the gear cutting machining and can thus easily be brought into engagement with the gear teeth by simple travel movements. The delivery of the deburring cutter to the gear cut workpiece in this respect takes place in a plane which extends in parallel with the X axis/Z axis and with the center axis of the machine table. In the working position, the deburring spindle is located between the gear cutting tool and the workpiece, but at least in front of the gear cutting tool. The deburring apparatus can thus be used without the gear cutting tool first having to be deinstalled from the machine. This also means that the gear teeth manufacturing process and the chamfering process can take place after one another in an automatically controlled manner and a fully cut workpiece leaves the machine. It would furthermore be possible to carry out a chamfering and deburring cutting between a plurality of milling cutting steps. This would not be possible with a necessary removal of the gear cutting milling tool.

The chamfering tool, for example a conical or cylindrical burr, is in this respect guided along the tooth edge of a gear tooth via axial movements of the cutting head with its chamfering and deburring apparatus, while the workpiece rotates at a predefined speed about its center axis. In a first step, the chamfer is first milled at an end face, for example at the upper side, of a gear tooth. Subsequently to this, the tool is delivered toward the oppositely disposed end face of the gear tooth and in a second step this end face is also provided with a chamfer. Via the pivot device for the chamfering spindle, its inward pivot angle can, for example, be controlled via the tooth height and can be varied based on the flank. A different chamfer can thus be generated on the right and left flanks and, where necessary, also at the tooth root and the tooth head.

Parameters such as the chamfer size, chamfer angle and chamfer extent can be stored in a technical program aspect in a cutting program in the machine control and can be set by the NC axes. For example, the parameters can be stored in a look-up table in the memory of a control system of the machine. The chamfer size can then, for example, also be influenced via the feed values or via the number of cuts. Controlled by the NC program, these chamfer parameters can be reproducibly generated at a plurality of workpieces.

In another example embodiment, the chamfering and deburring apparatus is still additionally mounted on a further delivery axis which extends in the radial direction toward the workpiece. A more dynamic movement in the X direction (delivery direction of the tooth height) is made possible by the lower mass to be moved, namely only the chamfering and deburring apparatus instead of the complete machine stand. Higher axial speeds can thus be traveled overall with all used axes. This is of advantage in chamfer cutting in the region of the tooth flanks since this is where the greatest changes of the radial delivery per angle degree are required at the workpiece. In the region of the tooth head and tooth root, in contrast, only small radial deliveries per angle degree are required at the workpiece.

Furthermore, it would be possible by an additional NC axis at the deburring apparatus to enable movements in parallel to the X-Z plane along the end face of the gear teeth at a higher speed since the moved mass is only composed of portions of the deburring apparatus and of the drive for the deburring tool so that the entire cutting head no longer has to be moved in the vertical direction (Z axis). The deburring apparatus may be configured differently depending on the required performance data by these different possible embodiments.

In another further embodiment, a measurement system can be arranged in the machine or at the cutting head of the machine with which measurement work may be carried out at the gear teeth. This may serve to determine and to document the gear tooth quality, but also to generate the gear teeth positioned with respect to a specific point. This measurement device may also be used in accordance with the present disclosure to determine the position of the gear teeth and the tooth shape at the workpiece and optionally also to determine the extent of the end face in the region of the gear teeth. This tooth contour thus does not have to be programmed in a complex manner, but can rather be calculated by the machine control by a simple measurement, e.g. of a single tooth gap and of the end face in the region of the gear teeth. It is sufficient in this respect if only one tooth or one tooth gap is measured. For the remaining gear, tooth contour may be calculated using gear tooth data such as the number of teeth, the tooth width, the helical angle of the gear teeth and other gear teeth data. These data are already known from the gear tooth generation and may also be entered into the calculation. A controller may then be configured with computer readable instructions stored on non-transitory memory to create a program for the chamfer cutting of the total gear teeth from this. This method can be used with involute and non-involute gear teeth. As such, the determination of the flank extent is not trivial with non-involute gear teeth.

It would equally be possible only to scan a part of a region of an individual tooth or of a tooth flank such as the tooth root and the tooth head region using the measurement device since the extent of the tooth flank is already known from the gear tooth cutting, especially with involute gear teeth. A chamfering program is thus achieved very simply and very fast without necessity of a large programming effort.

Another possibility for programming of the chamfer shape comprise a "teach-in" method, ideally user guided. Predefined reference points can be determined at a tooth gap by a probe manually traveling to predefined points, the probe being applied to the cutting head. The machine control can then subsequently also create from this, together with the gear tooth data known to the control, the cutting program for the remaining gaps. A plurality of reference points in the region of the tooth head radius and tooth root radius are important in this respect. The location of the involute along the tooth flank is very largely known by the preceding gear cutting process.

In a further example embodiment, the chamfering and deburring apparatus can also be utilized for further cutting operations at the workpiece, such as milling cutting operations, drilling operations or grinding operations. Different cutting operations can also be carried out after one another via an optionally automated tool or cutting head change at the chamfering and deburring apparatus.

Further features, details and advantages of the present disclosure will be explained in more detail with reference to embodiments shown in the figures.

DETAILED DESCRIPTION

FIGS. 1A through 5E show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 1:
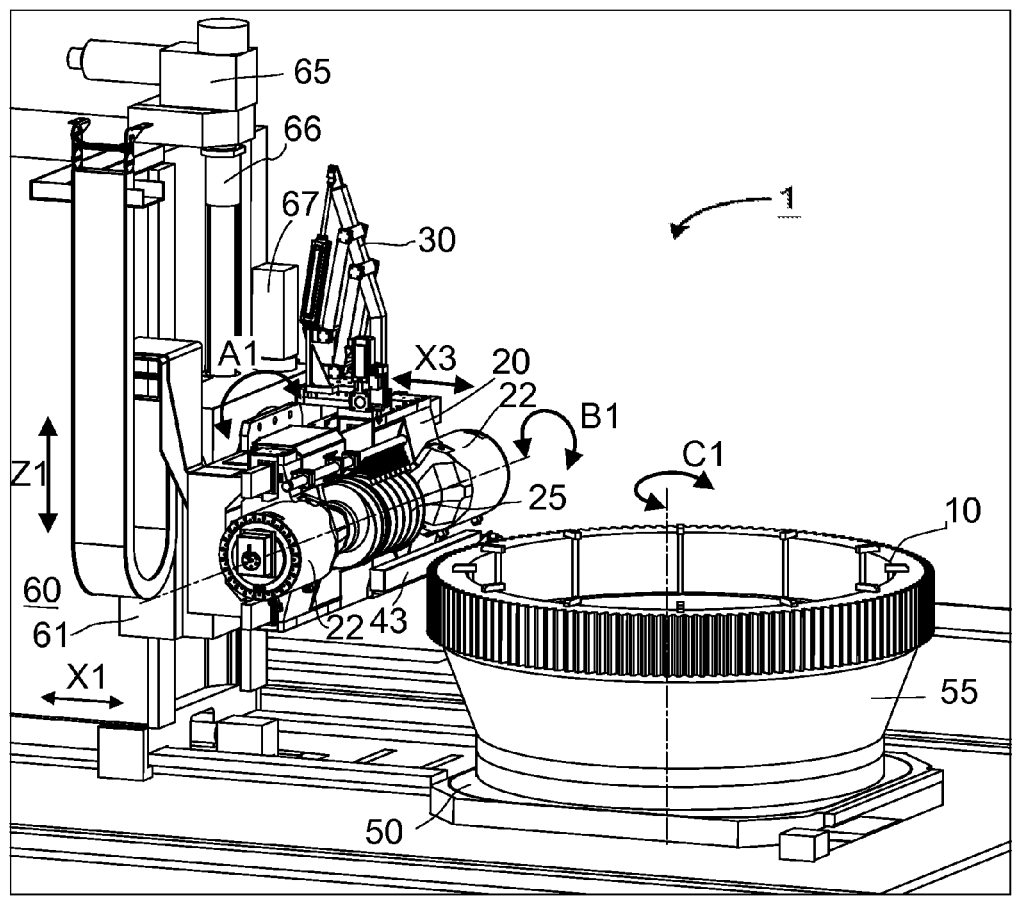
FIG. 1 shows a gear cutting machine with the chamfering and deburring apparatus in accordance with the present disclosure.

FIG. 1 shows a side view of the chamfering and deburring apparatus 30 in accordance with the present disclosure installed into a gear cutting machine 1 in accordance with the prior art. A workpiece 10 is clamped on a machine table 50 via a workpiece clamp 55. A cutting head 20 for receiving a tool 25, for example a hob, is mounted in a vertically travelable manner at a machine stand 60. The machine stand 60 is delivered with the cutting head 20 via the delivery axis X1 in the direction of the workpiece 10 for production of gear teeth. Depending on the cutting process, the milling cutting slide 61 is moved with the cutting head 20 from the bottom to the top with reference to the Z1 axis for generation of gear teeth. The gear teeth are thus generated using the hob 25 which is driven about the B1 rotational axis by the motors 22. The generation of the gear teeth takes place in this respect with coupled generation, i.e. the miller rotation (B1) and the miller movement in the Z1 direction take place dependent on the rotary position of the workpiece 10 or of the machine table 50 about the C1 axis. A measurement device 43 is shown at the bottom at the cutting head 20.

Figure 2:
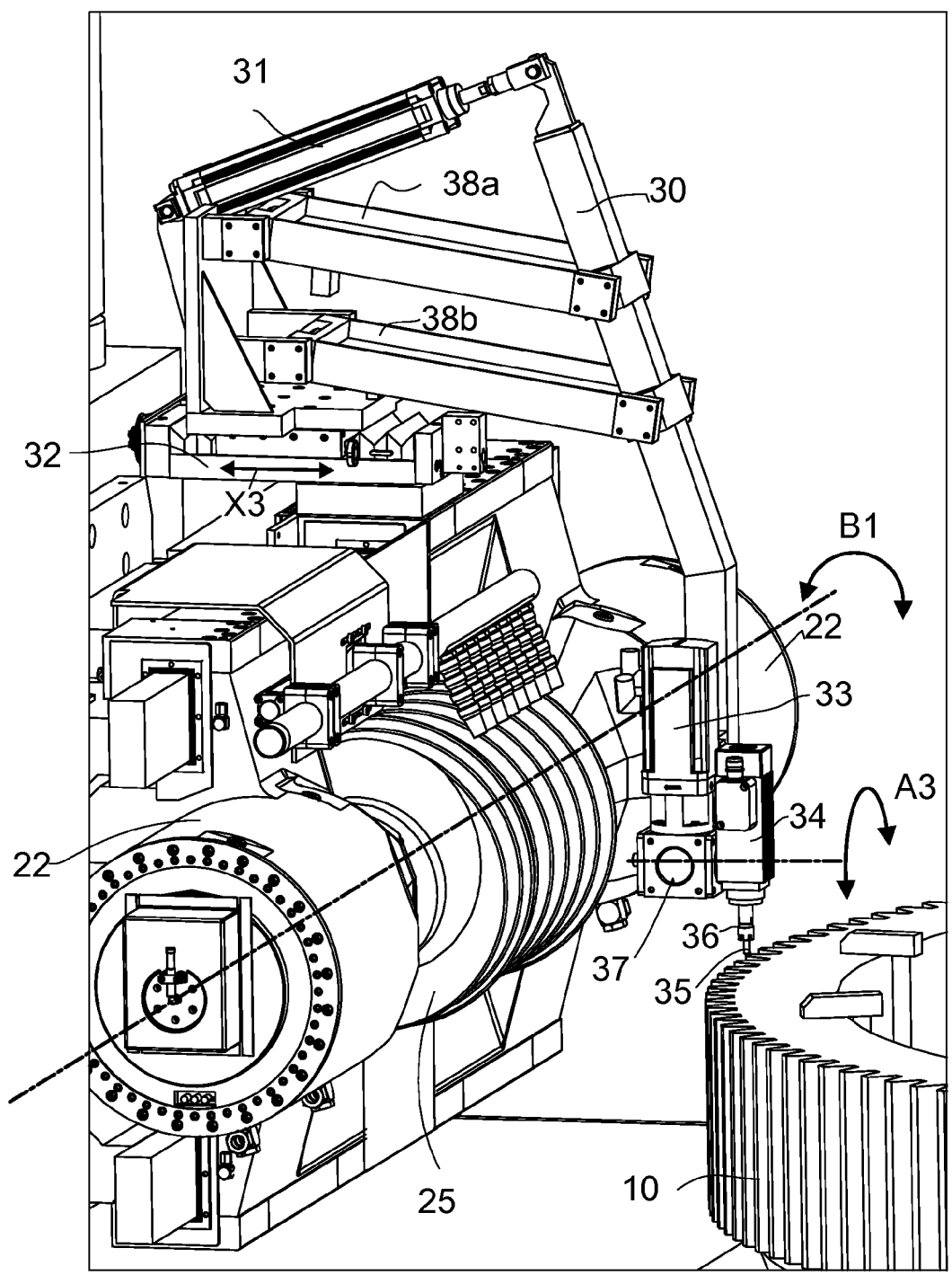
FIG. 2 shows a view of the chamfering and deburring apparatus of FIG. 1.

The milling cutting slide 61 is moved via a drive motor 65 and a ball screw spindle 66. The pivot angle of the cutting head is set to the tool inclination angle and to the helical angle of the gear teeth via the A1 axis using the axial motor 67. These axes simultaneously serve as setting axes for the chamfering and deburring apparatus 30. In addition, in this embodiment, the chamfering and deburring apparatus is still mounted on a separate delivery axis 32 (as seen in FIG. 2), X3 axis. Due to this configuration, the whole stand weight does not have to be moved in the X1 direction to move the deburring tool or the chamfering and deburring apparatus is movable radially in the direction toward the workpiece.

An example embodiment of the chamfering and deburring apparatus 30 is shown pivoted into its cutting position in the detailed view of FIG. 2. The chamfering and deburring apparatus is pivoted via multi joint arrangement or linkage 38a and 38b to an actuator 31, in this case a pneumatic cylinder, which pivots the chamfering and deburring apparatus from its parked position on top of the cutting head 20 into the working position. This actuator 31 could alternatively also be an NC axis. It would thus also be possible to travel to intermediate positions and thus to carry out cutting positions and movements with the chamfering spindle 34 in a vertical direction under NC control. The chamfering cutter 35 clamped in the chamfering spindle 34 and the tool mounts 36 cuts the tooth edge of the workpiece 10. The cutting of the upper end face of gear teeth is shown. The chamfering spindle 34 can be pivoted about the A3 axis via the pivot transmission 37 using the drive motor 33 for cutting the lower end face of the gear teeth. The chamfering cutter 35 can also be pivoted via this axis in its inclination with respect to the tooth edge, whereby a setting of the chamfer angle of the chamfer can take place. The movement of the chamfering and deburring apparatus 30 in this respect takes place in dependence on the table position.

Figure 3A:
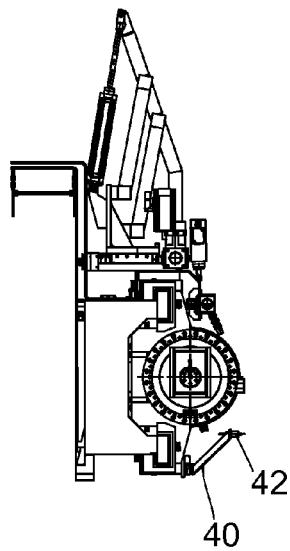
FIG. 3A shows a schematic representation of the chamfering and deburring apparatus in its parked position.
Figure 3B:
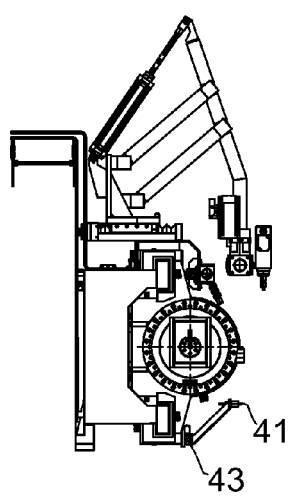
FIG. 3B shows a schematic representation of the movement of the chamfering and deburring apparatus from its parked position into the working position.
Figure 3C:
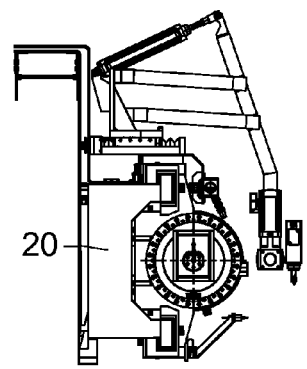
FIG. 3C shows a schematic representation of the chamfering and deburring apparatus at an intermediate position between its parked position and working position.
Figure 3D:
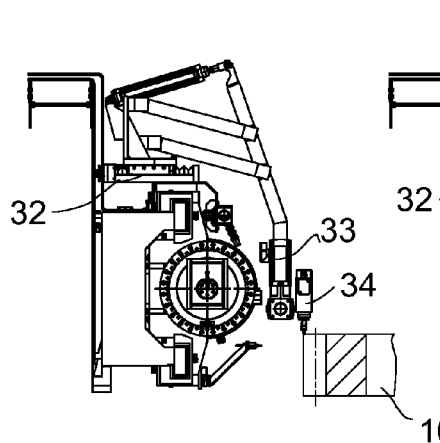
FIG. 3D shows a schematic representation of the chamfering and deburring apparatus as it reaches the working position.

FIGS. 3A to 3D show the pivoting movement of the chamfering and deburring apparatus 30 from its parked position in FIG. 3A to its work position in FIG. 3D. As seen in FIG. 3D, the chamfering spindle 34 is brought into engagement with the tool 35 and the workpiece 10 via this pivot movement. The measurement device 43 is shown at the bottom at the cutting head 20 with a measurement head 42 and a measurement probe 41 with which the tooth shape can be probed and thus the contour of the tooth edge can be determined for preparing the chamfer cutting.

Figure 3E:
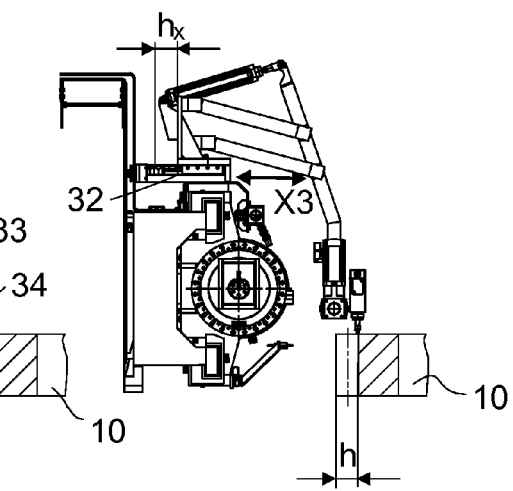
FIG. 3E shows a schematic representation of the movements of a chamfering spindle of the chamfering and deburring apparatus at its work position.
Figure 3F:
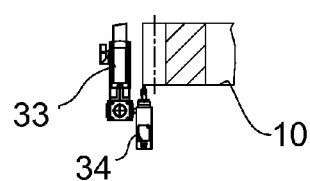
FIG. 3F shows a detailed view of the chamfering and deburring apparatus during the cutting of the lower side of a gear cut workpiece.

The chamfering and deburring apparatus is shown schematically in FIGS. 3E and 3F in the cutting of a tooth contour. In this case, the radial delivery of the tool to the workpiece and the movement in the direction of the tooth height take place via the delivery slide 32. The maximum cuttable tooth height (h) depends directly on the maximum delivery in the X3 direction (hx). FIG. 3E in this respect shows the maximum possible delivery over the X3 axis. If larger tooth heights are required, a movement must alternatively or additionally take place via the X1 axis.

FIG. 3F shows the chamfering spindle 34 cutting the lower end face of gear teeth at the workpiece 10. In this view, the chamfering spindle 34 is pivoted upwardly by 180° with respect to the pivot motor 33.

Figure 4:
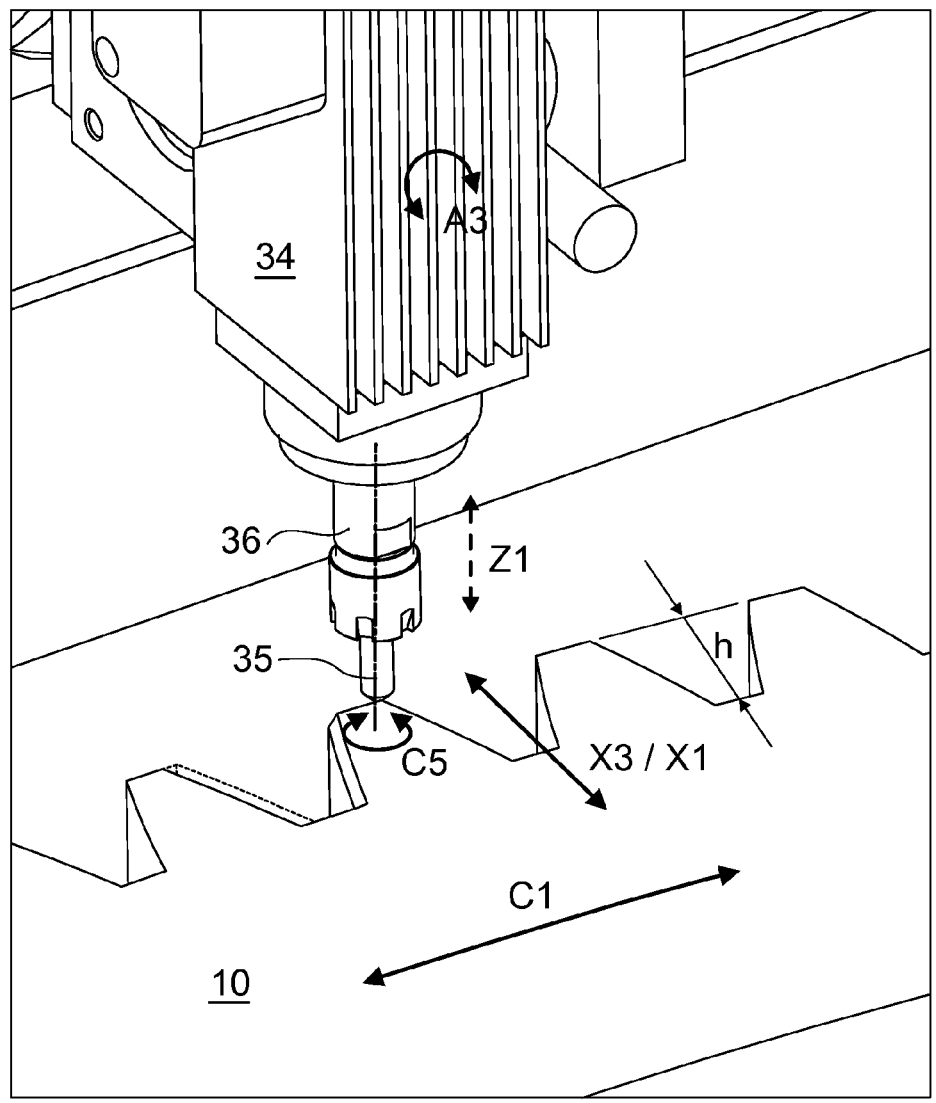
FIG. 4 shows a detailed view of the chamfering and deburring apparatus of FIG. 1 with the deburring tool in cutting engagement.
Figure 5A:
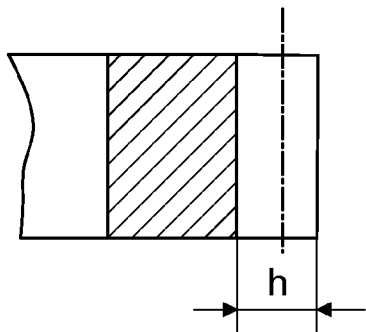
FIG. 5A shows a schematic representation of a first example gear cut workpiece with a planar face in the region of the gear teeth.
Figure 5B:
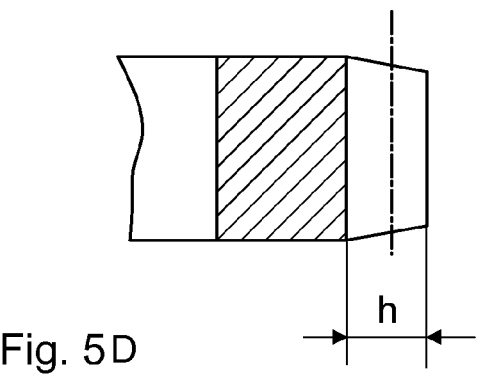
FIG. 5B shows a schematic representation of a second example gear cut workpiece with a definite face in the region of the gear teeth.
Figure 5C:
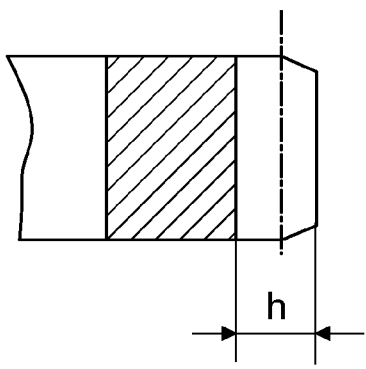
FIG. 5C shows a schematic representation of a third example gear cut workpiece with a definite face in the region of the gear teeth.
Figure 5D:
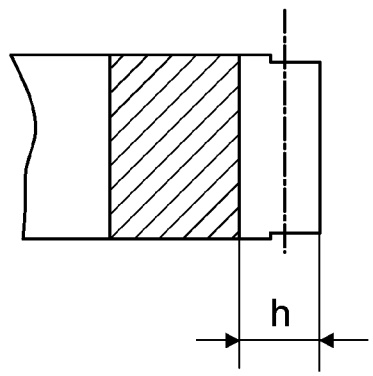
FIG. 5D shows a schematic representation of a fourth example gear cut workpiece with a definite face in the region of the gear teeth.
Figure 5E:
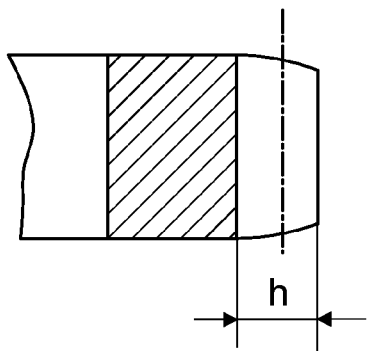
FIG. 5E shows a schematic representation of a fifth example gear cut workpiece with a definite face in the region of the gear teeth.

FIG. 4 is a detailed view in which the chamfering spindle 34 is shown with the chamfer cutter 35 at the cutting point. The miller follows the tooth edge contour such that it is moved via the X3/X1 axis radially in the direction of the tooth height, while the workpiece rotates about its C1 axis. The miller follows the gear teeth in the 2D area by the combination of the X and C movements. Gear teeth with a planar face such as are shown in FIG. 5A can thus be chamfered. If, however, the end faces in the region of the gear teeth are formed as shown in FIGS. 5B to 5E, a controlled vertical movement needs to be additionally carried out in the Z1 direction (shown by a dashed line in FIGS. 5A to 5D) depending on the tooth height. With helical gear teeth, a movement can additionally take place about the A3 axis to balance the chamfer size between the right flank and the left flank.

The invention claimed is:

1. A method for chamfering and deburring a gear cut workpiece, comprising:
    arranging a chamfering and deburring apparatus on a slide that supports a cutting head of a gear cutting machine, wherein the chamfering and deburring apparatus comprises a chamfering spindle; and
    cutting a chamfer by pivoting the chamfering spindle with a chamfering miller attached thereto, relative to the cutting head, from a rest position at which the chamfering spindle is located on the slide and above a tool mount for a gear cutting tool, into a work position at which the chamfering spindle is located horizontally beside the tool mount and within a working region of the gear cutting tool,
    wherein, when cutting the chamfer, the chamfering spindle is positioned with the chamfering miller closer to the gear cut workpiece than is the gear cutting tool so that the gear cutting tool can remain in the tool mount; and
    a portion of movements of the chamfering spindle for a contour tracking along a tooth edge of the gear cut workpiece takes place by movement of the chamfering spindle along one or more axes of the gear cutting machine.

2. The method in accordance with claim 1, wherein the portion of movements of the chamfering spindle along the one or more axes of the gear cutting machine is effected via movement of the cutting head along a Z axis of the gear cutting machine and/or movement of a machine stand, to which the cutting head is attached, along an X axis of the gear cutting machine; and wherein another portion of the movements of the chamfering spindle for the contour tracking along the tooth edge of the gear cut workpiece takes place by movement of the chamfering and deburring apparatus along an X axis of the chamfering and deburring apparatus.

3. The method in accordance with claim 1, further comprising determining, using a measuring device integrated in the gear cutting machine, a location and shape of a tooth gap, and a location and shape for upper and lower end faces in a region of gear teeth to determine a tooth edge extent for the chamfer.

4. The method in accordance with claim 1, further comprising determining, via a measurement device integrated in the gear cutting machine, parts of a tooth profile including a tooth root, a tooth head, and upper and lower end faces in a region of gear teeth; and determining remaining values for describing a tooth edge extent from gear cutting data.

5. The method in accordance with claim 1, further comprising measuring one or more of: one tooth, one tooth gap, parts of the tooth and tooth gap, and upper and lower end faces in a region of gear teeth; and using data from the measuring for cutting further tooth gaps.

6. The method in accordance with claim 1, wherein, for helical gear teeth, a pivot angle of the chamfering spindle is controlled based on a cutter position relative to a tooth height and to a flank side.

\* \* \* \* \*